United States Patent [19]

Levoni et al.

[11] 4,223,724

[45] Sep. 23, 1980

[54] DEVICE FOR CLEANING, WIDENING AND REPAIRING WELLS OF DRINKING WATER AND IRRIGATION WATER

[76] Inventors: Carlo F. Levoni; Gian P. Levoni, both of Caretera Negra, 97, Apartado 47, Anaco, Venezuela

[21] Appl. No.: 862,055

[22] Filed: Dec. 19, 1977

[30] Foreign Application Priority Data

Dec. 22, 1976 [IT] Italy .............................. 40167 A/76

[51] Int. Cl.[2] ........................ E21B 37/00; E21B 43/00

[52] U.S. Cl. .................................. 166/68; 166/105.1; 166/312; 166/314

[58] Field of Search ...................... 166/68, 105, 105.1, 166/314; 417/108, 109

[56] References Cited

U.S. PATENT DOCUMENTS

| | | | |
|---|---|---|---|
| 721,594 | 2/1903 | Moran | 417/108 |
| 1,074,797 | 10/1913 | Kaiser | 417/109 |
| 1,200,423 | 10/1916 | Huff | 417/109 X |
| 1,284,594 | 11/1918 | Christman | 417/109 |
| 1,302,268 | 4/1919 | Abrams | 417/109 |
| 1,360,053 | 11/1920 | Stumpf | 166/105 X |
| 1,730,682 | 10/1929 | Oliphant | 417/109 |
| 1,776,889 | 9/1930 | Claytor | 166/105 |
| 1,864,420 | 6/1932 | Evans | 166/105.1 |
| 2,008,114 | 7/1935 | Taggart | 417/109 |
| 2,034,798 | 3/1936 | Clark | 166/314 X |

FOREIGN PATENT DOCUMENTS

| | | |
|---|---|---|
| 908239 | 4/1954 | Fed. Rep. of Germany . |
| 973316 | 1/1960 | Fed. Rep. of Germany . |

*Primary Examiner*—Stephen J. Novosad
*Assistant Examiner*—George A. Suchfield
*Attorney, Agent, or Firm*—Browdy and Neimark

[57] ABSTRACT

A device for cleaning, widening and repairing of wells comprises a pipe for supplying, through a valve, compressed-air into the well and a water and air discharge pipe coaxially surrounding the air supply pipe and terminating at its upper end with a bell airtightly welded to the periphery of the air supply pipe. The water and air discharge pipe as its upper part has a first port communicating with a water discharge pipe through a valve and a second port communicating with an air discharge pipe through another valve. A head surrounds the upper portion of the water and air discharge pipe and at its upper end is airtightly welded to the periphery of the water and air discharge pipe and at its lower end terminates in a flange detachably secured to the upper end of the well-jacket. The head has a third port communicating through a valve with a pipe for discharging and similar purposes. Moreover, there are provided two annular rubber diaphragms for defining in the depth of the well the zone in which the compressed-air has to be blown for widening the well and other elements to remove deposits, stones and putrid waters. Another device is provided for removal of the pebble gravel of the well-filter and earth blocks clogging the well-filter.

7 Claims, 9 Drawing Figures

DEVICE FOR CLEANING, WIDENING AND REPAIRING WELLS OF DRINKING WATER AND IRRIGATION WATER

The present invention relates to a device for draining, widening and repairing wells of drinking and irrigation water, and more particularly to a system to carry out well cleaning operations, well filter widening, and clogging removal in order to improve the wells themselves, to increase the flow and to remove sand, stones and impurities dragged into the water delivered; improvements concern new and profitable changes in the preceding devices, and the adoption of new devices and new application methods for these devices.

BACKGROUND OF THE INVENTION

The prior state of the art implies methods and devices by which the emptying of the wall is obtained by blowing compressed air towards the bottom of the well in a special pipe coaxially inserted inside the water delivery pipe, the air being blown in in such a way that the bottom water goes up into the internal hollow space existing between the delivery pipe and the air pipe, and is discharged through the valve located at the top of the delivery pipe.

SUMMARY OF THE INVENTION

The prior state of art involves some defects and drawbacks. First of all, besides the fact that such a device does not allow the bottom water to be discharged when wells have depths greater than 120 m, it happens that, under compressed air thrust, water goes up a certain length, not only in the internal hollow space but also in the external hollow space existing between the well jacket and the delivery pipe. Since there are some slits at different heights in the jacket corresponding to different waterbeds, dirty water, coming from the well bottom and the lower section of the wall of the well itself, pollutes the higher waterbeds. Moreover, such a device does not allow for discharging putrid waters that stagnate around the well even for many dozens of meters and does not allow for the widening of the original hole of the well without removing the jacket and other materials inside the well, when the water flow or the thickness and efficiency of the gravel filter surrounding the well have to be increased. Finally, such a device involves the possible clogging of the upper slits of the well jacket, because sand and slime standing at the bottom of the well can be dragged up by the water pushed pneumatically and can stop at upper levels, clogging and polluating the water-beds.

Because of these defects and disadvantages, it is necessary to solve the new technical problem by finding a device which allows a whole cleaning, that is to say the real draining, not only of the water contained inside the well, but also of stagnating waters around the well hole within a hundred-meter radius. This is the only way of obtaining a satisfactory cleaning of the well and of the different water-beds, since it is necessary to take limpid and drinking water out of the well for irrigation and drinking water supply, because of the germicidal power of air, and above all because of the slime, putrid water, stones and dirt which have to be removed. Also, it is possible to adjust the same device to widen the original well hole according to what has been explained above, to remove filter cloggings due to building irregularities, or to strong de-pressures caused by the pump, and/or to earth blocks.

The present invention solves completely, principally, the above-mentioned new technical problem by using a device consisting of a particular head inserted at the upper end of the last section of the well-jacket appearing on the surface ground; this head, which can be installed only during the intervention periods or also during normal working of the well by compressed air, comprises a central compressed air supply pipe fixed to the upper end of the bell of the head itself, externally equipped with a valve for compressed air supply; water and air discharge pipe coaxially surrounding to the air supply pipe and ending with the same bell, which is equipped on the top with a deviation to discharge water from the well through a valve, and with another deviation equipped with a valve to discharge the compressed air, an external pipe, coaxially surrounding the other two, sealed on the top onto the water and air discharge pipe and terminating at the lower end in a flange to be secured to the upper end flange of the well-jacket, said external pipe being, equipped with a connection to discharge washing water through a valve. Furthermore, there are other means along the well depth to facilitate cleaning and widening and to eliminate pebble gravel and filter clogging earth, and in the external upper surface in order to measure the water flow.

BRIEF DESCRIPTION OF THE DRAWINGS

Some embodiments of the present invention are illustrated in the attached drawings in which.

DETAILED DESCRIPTION OF PREFERRED EMBODIMENTS

Figure 1:
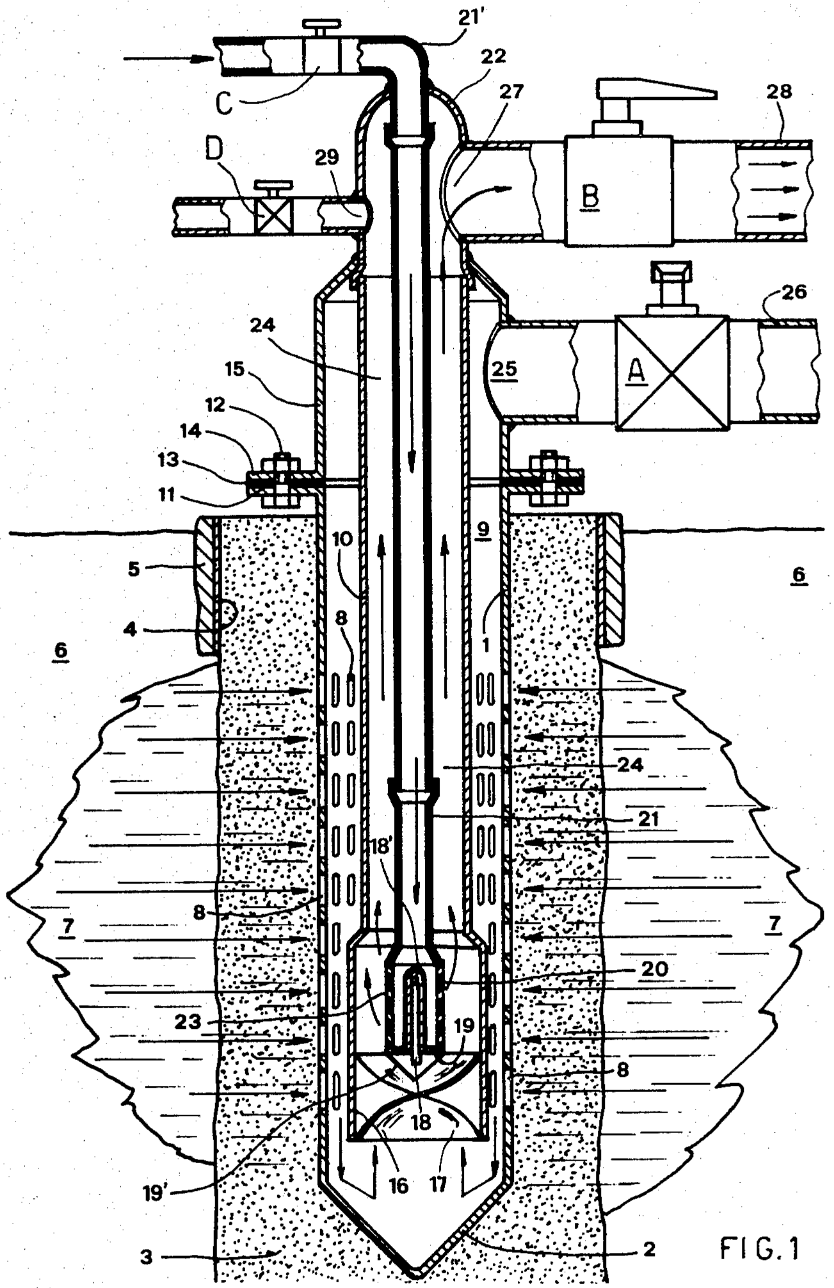
FIG. 1 is a vertical section view of a well with a device in it suitable for sounding the conditions of the well and also determining the degree of pollution so as to make it possible to decide whether it is necessary to perform cleaning operations, and/or hole widening, and/or filter thickening, besides well cleaning from sand, pebbles stones and dirt.

Referring to the figures particularly FIG. 1, metal well-jacket 1 ends in its lower section with cone 2 that penetrates for stabilization into the well-filter 3 consisting of sand and pebble gravel. A metal jacket 4, embanking the earth thrust and controlling the surface waters, is surrounded by a concrete casting 5. The ground 6 surrounding the well includes water beds 7 distributed in depth and width in different ways. Some slits 8 of well-jacket 1 allow water from water beds 7 to enter, through filter 3, annular hollow space 9 existing between well-jacket 1 and the water and air discharge pipe 10 Such pipe is formed by screwed sections so that it can be lengthened at will. An upper flange 11 of the well-jacket 1, is detachably fixed, by means of bolts 12, with an interposed gasket 13, to the flange 14 of the lower section of the head 15. The head 15 is air tightly welded at the top to pipe 10. In normal well functioning, flange 14 is replaced by a similar flange bearing the pump. The discharge pipe 10 includes a lower end widening 16, containing a sheet-metal element 17 having a helical shape, fitted for creating a whirling flow to make the water rise. A stem 18 is secured to the bottom plate 19 which is equipped with water diverting cone 19'. The compressed air supply pipe 21 has a widened portion 20 at the bottom and is screwed at the top to an elbow 21' and air-tightly welded to the upper end of the bell 22 of the water and air discharge pipe 10 to form the head top. The air supply pipe 21, extending along the axis and the whole length of the device, is also made up of screwed sections to form so that it can be lengthened at will Air supply pipe is surrounded for its whole length and more by the water and air discharge pipe 10. Some slits 23 in the widening 20 are slanted upwardly in order to orient the air coming from the air supply pipe 21, towards the upper section of the hollow space 24 existing between the air supply pipe 21 and the discharge pipe 10. A is the valve, or gate valve, or tap to discharge well cleaning water from the hollow space 9, through a port 25 of the lower section of the head 15, to a discharge pipe 26 during widening operation. B is the valve, or gate valve, or tap the discharge cleaning water from the hollow space 24, through a port 27 of the head 15, to a discharge pipe 28. C is the valve, or tap, for supplying compressed air (for example at 15 atmospheres) into pipe 21. D is the valve, or gate valve, or tap to discharge the compressed air through a port 29 of the water and air discharge pipe 10.

Figure 2:
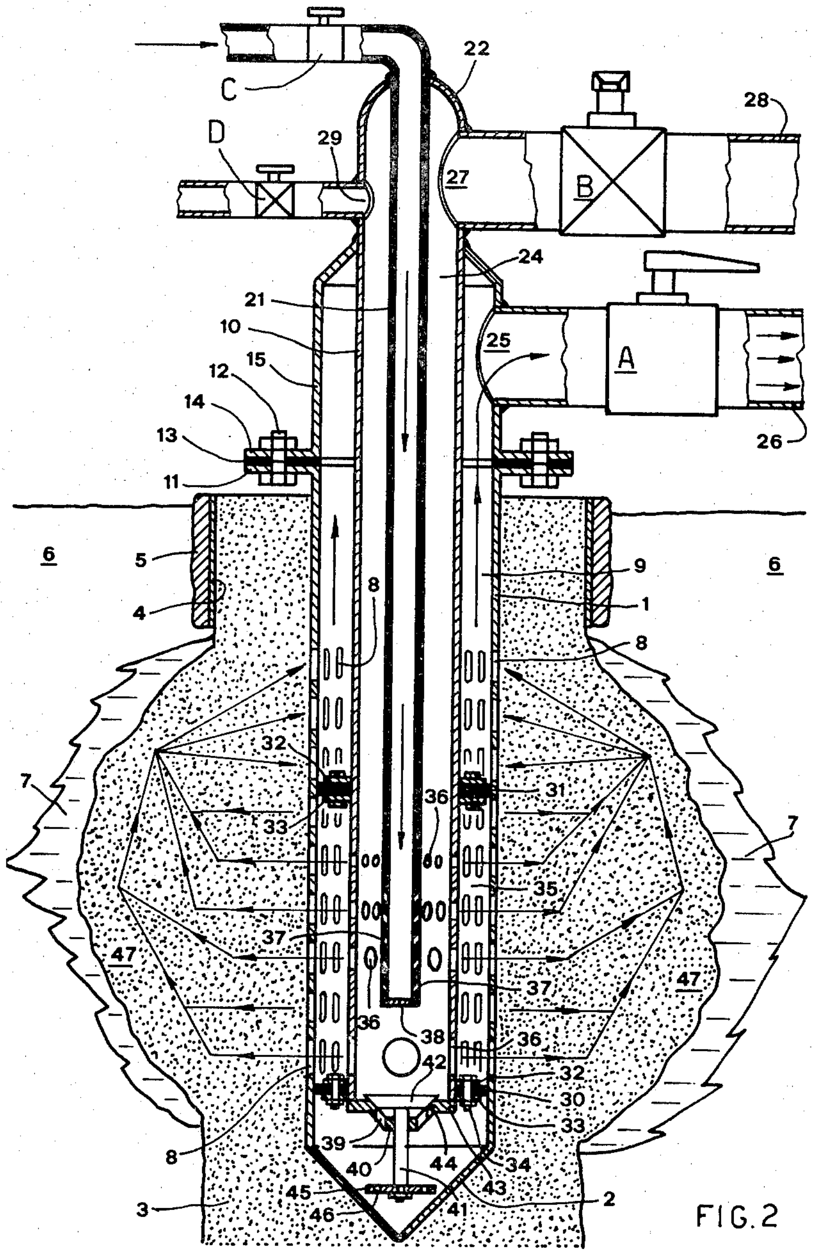
FIG. 2 is a vertical section view of a well with a device fitted in it for executing well widening by repeated action of compressed air, and then by dropping pebble gravel from the top in order to fill the widening with filtering material so that sand, because of the increased filter thickness, is no longer dragged from the delivered water: this is the expansion phase.
Figure 3:
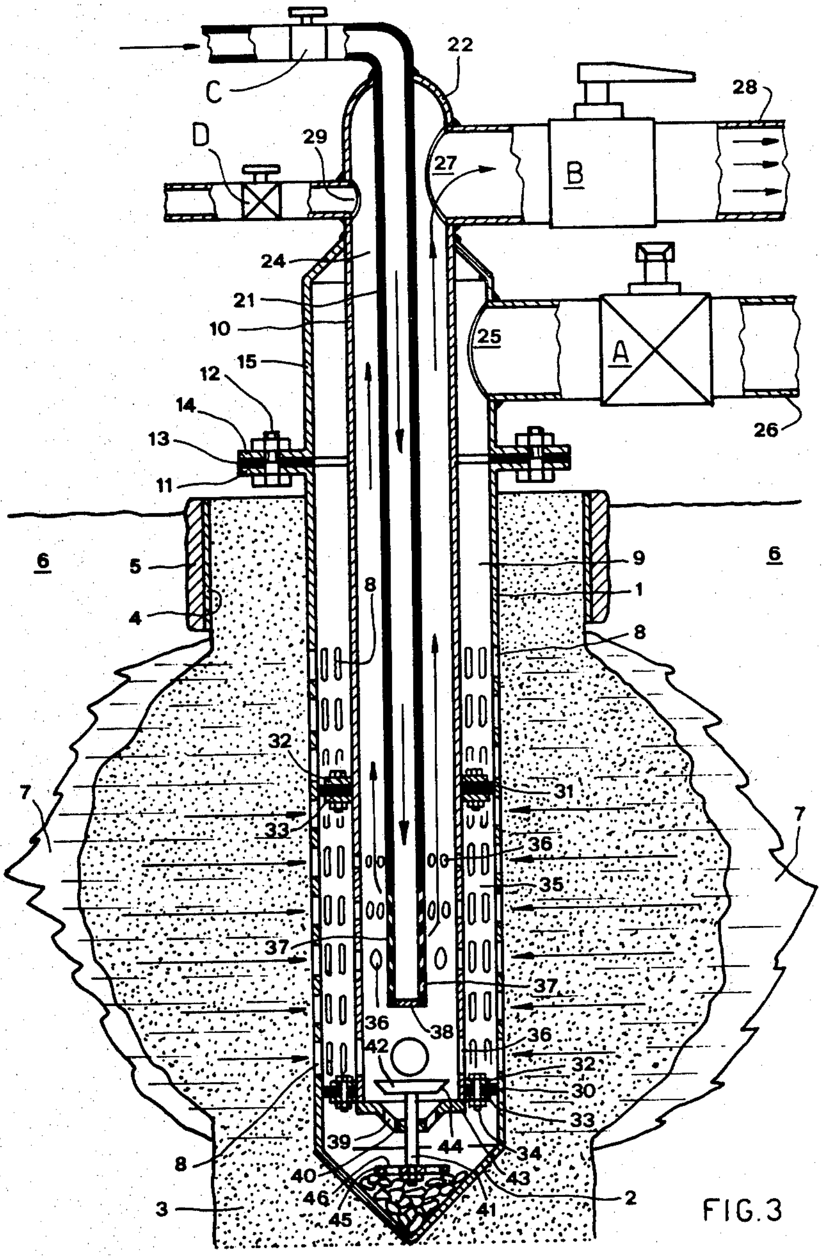
FIG. 3 is a vertical section view, as in FIG. 2, concerning the suction phase following the expansion phase.

In the embodiment of FIGS. 2 and 3, two annular rubber diaphragms 30 and 31 are tightened between fixed washers 32 and mobile washers 33, respectively, by means of bolts 34. Such diaphragms are sealed against the well-jacket 1 so that a hollow space 35 is formed, communicating with the hollow space 24 through holes 36 that exist in the wall of the water and air discharge pipe 10 between the two annular rubber diaphragms 30, 31. The holes 36 are arranged in several staggered orders and have a diameter decreasing from the lower to the upper orders. Upwardly inclined slits 37 are disposed in the lower end section of the air supply pipe 21. The air supply pipe 21 is closed by means of bottom 38. Some radial arms 39 support a central hub 40 in which there is coupled with a vertically sliding fit, a stem 41 of a disk 42. A ring 43 is fixed at the end bottom of the discharge pipe 10, inside of which are fixed the radial arms 39. A peripheral truncated-cone surface 44 of the disk 42 couples with the corresponding surface of the ring 43. A counterweight disk 45 is disposed at the lower end of the stem 41. Some holes 46 of the counterweight disk 45 allow the water, which is dragging sand and dirt, to flow through the slits 39 when counterweight disk 45 has been pushed upwards completely by contacting sediment existing on the bottom of the well. The elements 39, 40, 41, 42, 43, 44, 45 and 46 constitute a gravity operated valve. A well-filter zone concerning well widening is shown at 47 and 48 (shown in FIG. 6) is a deposit of slimy waters in the bottom area of a well without a filter, existing also in wells provided with a filter.

Figure 7:
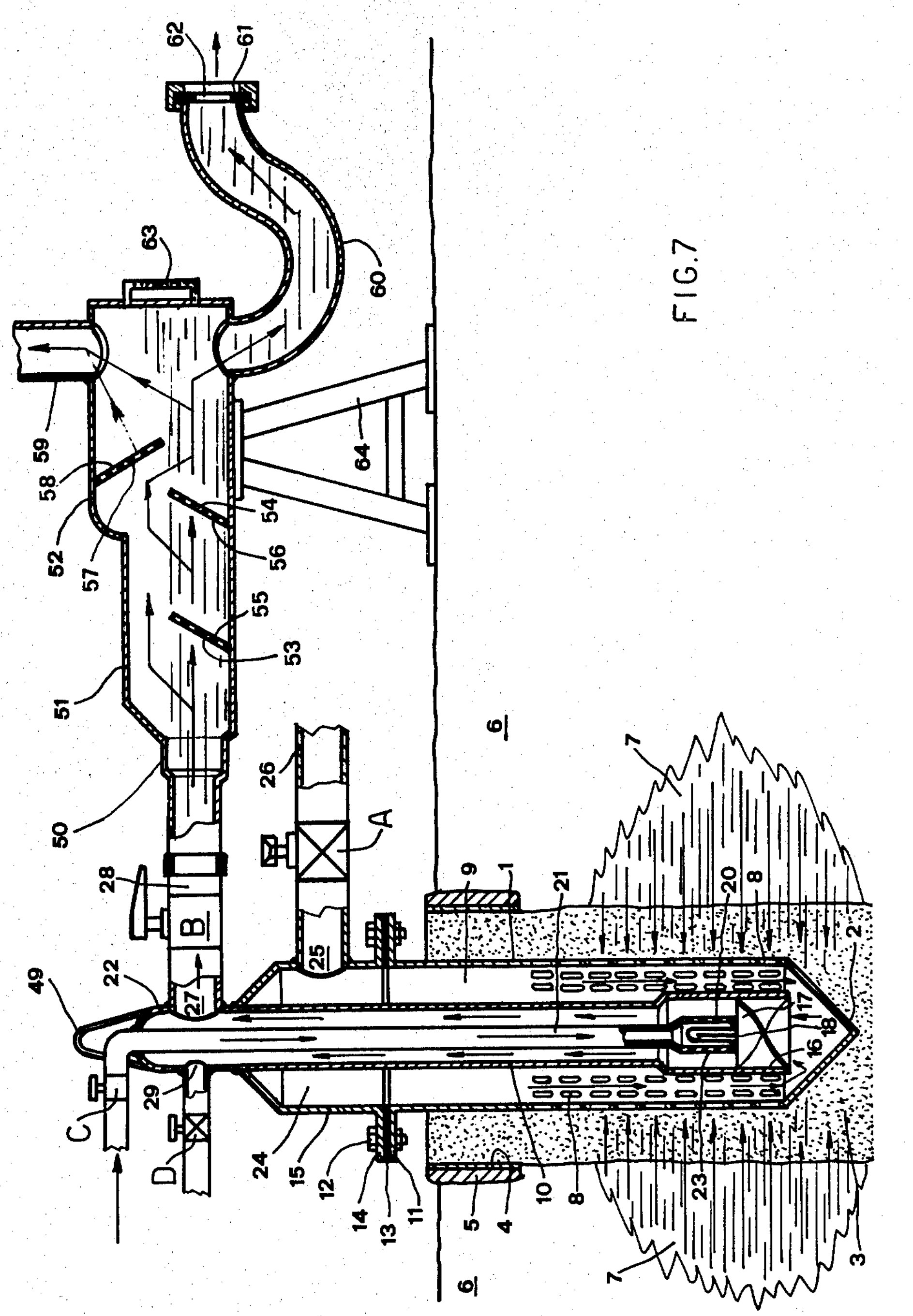
FIG. 7 is a vertical section view of a well such as that of FIG. 1, equipped with a device to separate water from air and to gauge the water flow which the well can deliver after cleaning.

In the embodiment of FIG. 7, a lifting eyebolt 49 is fixed to bell 22. A a cylindrical element 50 is screwed to the discharge pipe 28, which element becomes successively widened to form the bodies 51 and 52 in order to let water decrease its own speed and therefore facilitate the separation of air from water. Diaphragms 55 and 56 are disposed on the bottom of the cylindrical element 50, which diaphragms have horizontal holes 53 and 54, respectively, made therein. These holes 53 and 54 are inclined forward and upwards in the direction of the flow in order to help the air go up to make its separation easier while allowing the water to flow horizontally. Diaphragm 57 is inclined forward and downwards, fixed to the upper part of body 52, beyond diaphragms 55 and 56, having the opposite function of letting air pass upwards through holes 58 and compelling water to deviate downwards. An air discharge pipe extends upwardly from upper portion of the body 52. A pipe 60 extends in a curve from the outer bottom portion of the body 52 and has a replaceable ring 61 at its outlet and a calibrated outlet port 62 for measuring the water flow with the center positioned at a level substantially the same as the bottom of cylindrical element 50. A transparent glass gauge is provided at the forward end of the body 52 such that the lower limit is positioned higher than the bottom of said bodies 51 and 52, and at a level substantially the same as the upper limit of said outlet port 62. A support 64 secures the bodies 51, 52 on the earth.

Figure 8:
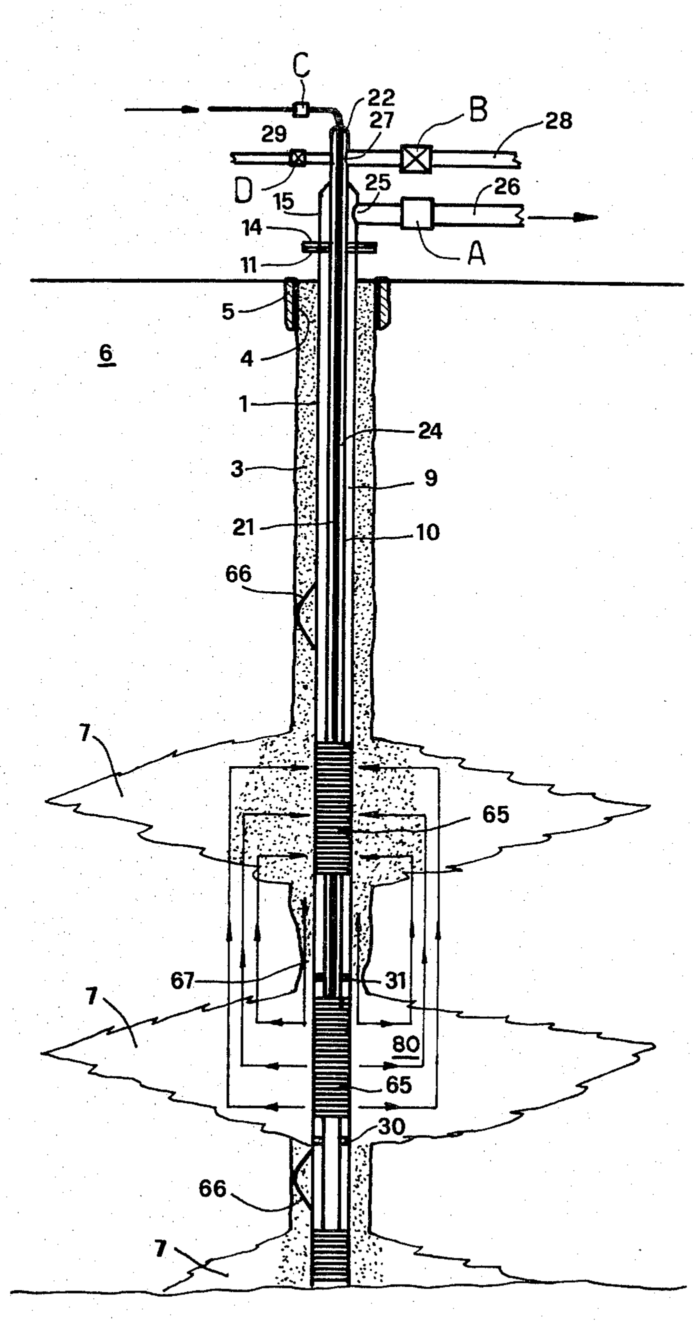
FIG. 8 is a vertical section view of a very deep well (for example, even more than 200 m.) wherein the device serves to remove the pebble gravel filter, which is now suspended and locked owing to different causes, and to restore the filter by eliminating the caverns caused by the pump suction.

In FIG. 8, one or more sections 65 of the well-jacket 1 are equipped with horizontal or also vertical slits communicating with the water-beds 7. Means 66 are provided for centering the well-jacket 1 in filter 3 hole. A clogging zone 67 is formed of suspended pebble gravel and caused by a deviation of the well hole axis which makes the peripheral filter thickness asymmetric in that zone, or by too much pump suction, or by compact sandy formations in the pebble gravel of the filter itself.

Figure 9:
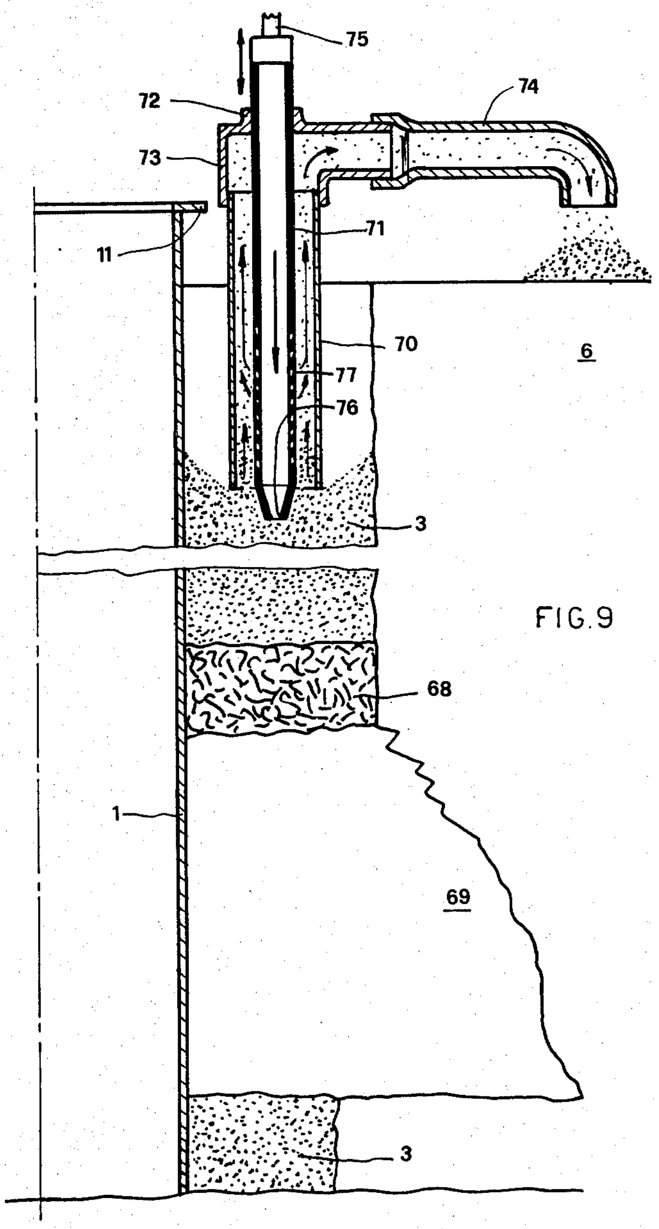
FIG. 9 is a partial vertical section view of a zone surrounding a well, concerning a device to eliminate an earth blocks accidentally fallen into the filter to restore the well-filter avoiding an additional formation of caverns.

In FIG. 9, a compact earth block 68 is shown which has accidentally fallen while filling filter 3 with pebble gravel. A cavern 69 is formed as a result of the fall of an earth block 68, which has caused a movement of the pebble gravel filter downwardly and has caused an erosion with water and sand intake. This sand is not stopped by the filter 3 which has been moved downwards by the earth block 68. A pipe section 70, extensible downwardly by means of other sections screwed to it coaxially surrounds another pipe 71 coupled by a vertical sliding fit with a port 72 of a pipe fitting 73 screwed to the upper end of the pipe section 70. A radial pipe 74 radially extends from pipe fitting 73 and discharges the pebble gravel standing on the earth block 68 and the earth of the block itself. An air inlet pipe 75 supplies compressed air into the pipe 71. Pipe 71 has a tapered conical end 76 and slits 77 slanted upwardly.

The functioning of the devices takes place in the following way. During the sounding or cleaning operations (see FIG. 1), the air, pressure, is sent through valve C into the air supply 21 while valves A and D are closed, and goes up into the hollow space 24, passing through inclined slits 23 and producing thus a vacuum at the base of the widening 16 of the discharge pipe 10, which causes an inflow of water mixed with sand from water-beds 7 through slits 8 of the well-jacket 1. This water mixed sand, passing through the helically shaped sheet steel element 17, takes a whirling flow which facilitates the going up of the water along the hollow space 24 and the downflow through the port 27 and through the open valve B into the discharge pipe 28, so that the operator can judge if additional cleaning operations are necessary or not.

In the well widening operation (see FIGS. 2 and 3), compressed air is blown from valve C into the air supply pipe 21, valves B and D being closed. Such air goes out from the slits 37 of the air supply pipe 21, penetrating, through holes 36 of the discharge pipe 10, into the hollow space 35 being between the diaphragms 30 and 31, so as to be compelled to go out through the slits 8 of the well-jacket 1, to penetrate into the filter 3, widening it, and to flow back then toward the well-jacket 1, entering its upper section through slits 8. After entering the well-jacket 1, the air goes up into hollow space 9 and and runs through the port 25 and the open valve A into the discharge pipe 26, dragging dirt, earth, sand and stones. During the widening of the filter 3, in fact, the pebble gravel, continuously fed, goes down from above to occupy the parts of the water-beds 7 affected by widening of the filter 3. The filter widening (see FIG. 2) is produced by the action of compressed-air which comes into the air supply pipe 21 from open valve C, goes out from pipe 10 through slits 37, passes through holes 36 and slits 8 into filter 47 and turns outwards and upwards eroding the sand walls of water-bed 7, at last entering, through upper slits 8, hollow space 9 and running out through the discharge pipe 26 and the open valve A, dragging thus everything that is contained in the water bed and which may pass through the slits themselves. The valves B and D must be closed. In such a way the compressed-air power is concentrated in only one water-bed and its action is, therefore, as effective as possible.

If there are some sediments on the bottom of the well-jacket 1, the widening of the well-filter 3 is made as follows (see FIG. 3). At the beginning, the valves A and D are closed, the valves B and C are opened and the disk 42 is lifted from its conical seat because of the contact of the counterweight disk 45 against the sediments accumulated on the bottom of the well, for example because of the passing of fine pebble gravel through the slits 8. In such a way, all the sediments, including stones, are drained away by the suction caused by the compressed-air going out from the slits 37, being dragged upwards through the holes 46 and run out through the valve B. When the sediments are completely removed and the disk 42 returns by gravity into its conical seat, closing the lower end of the discharge pipe 21, the valve B must be closed and the valve A open so that it is possible to perform the widening of the well-filter 3, as described above.

Figure 4:
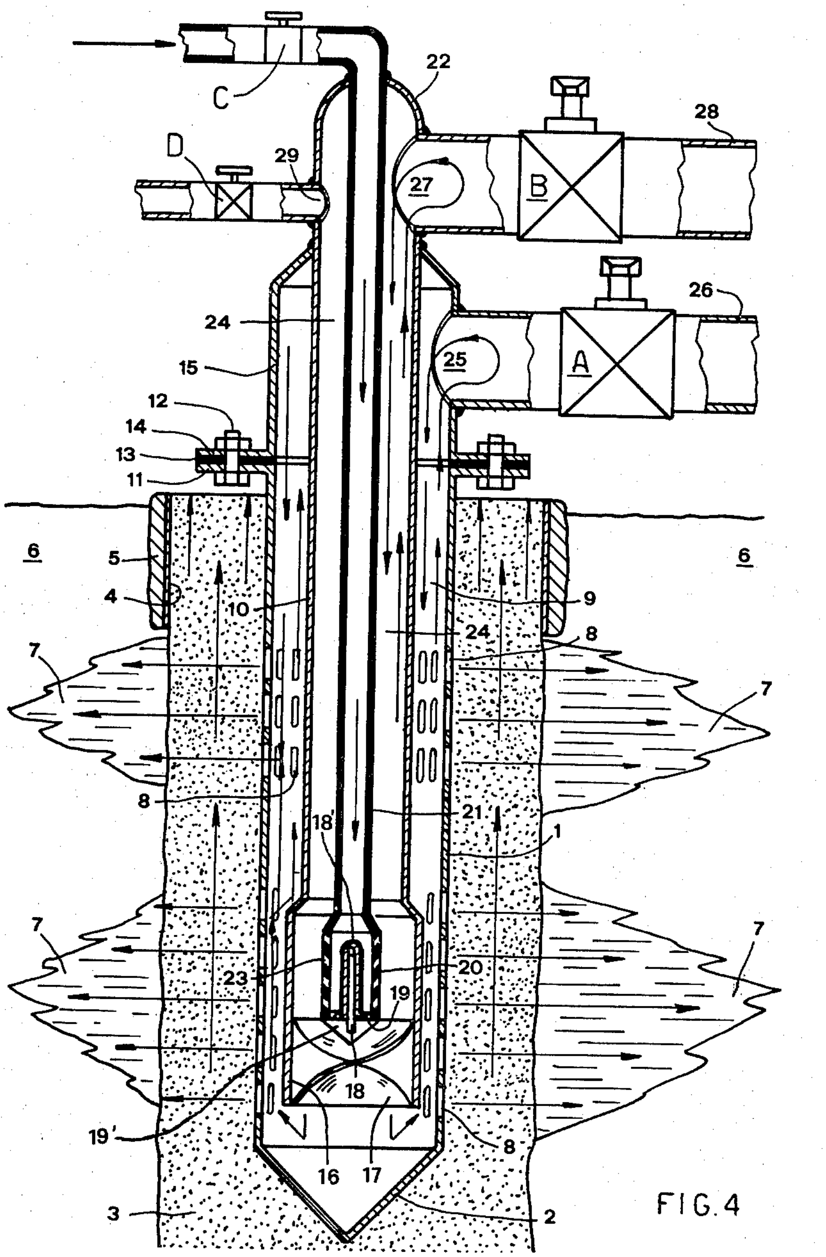
FIG. 4 is a vertical section view of a deep well (for example, 150–200 m or more) concerning the expansion phase during cleaning operations when the well is temporarily dry.
Figure 5:
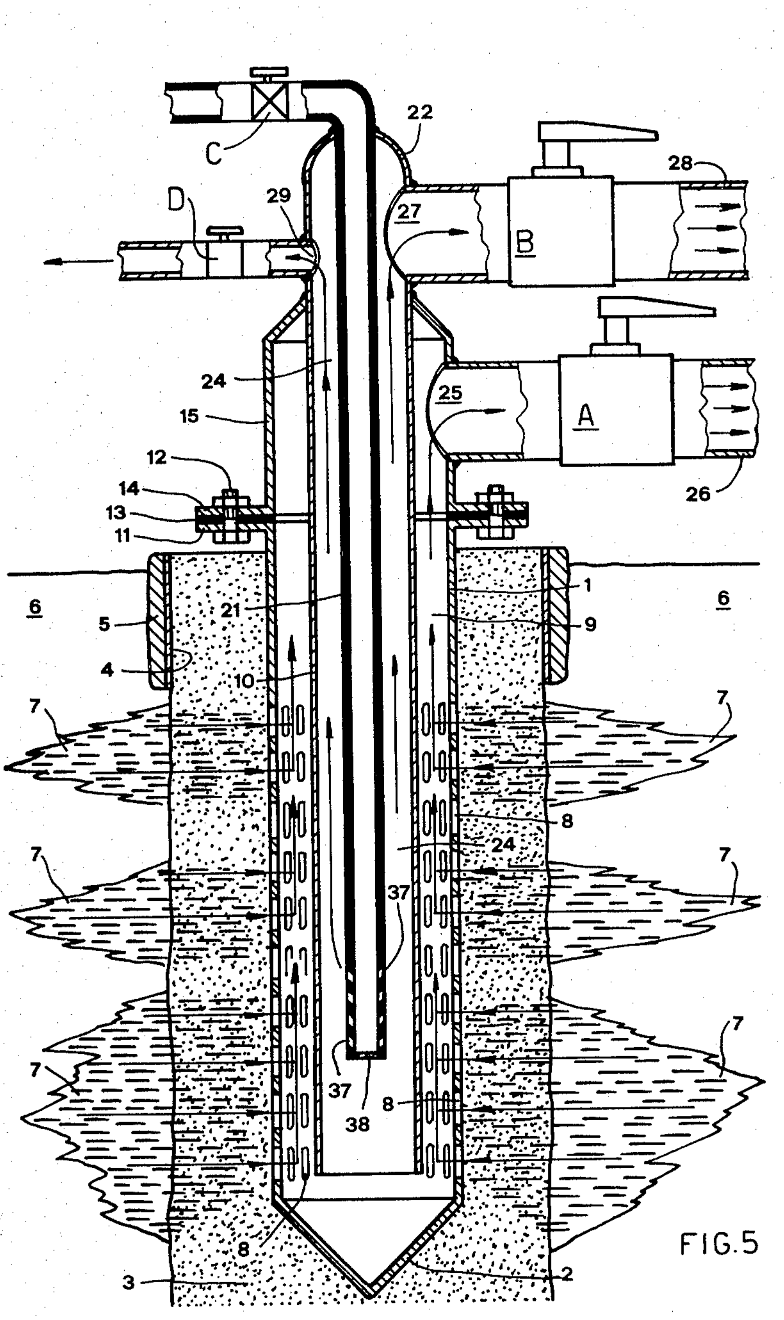
FIG. 5 is a vertical section view of the well of FIG. 4, concerning the following suction phase during which sand and dirt are removed.
Figure 6:
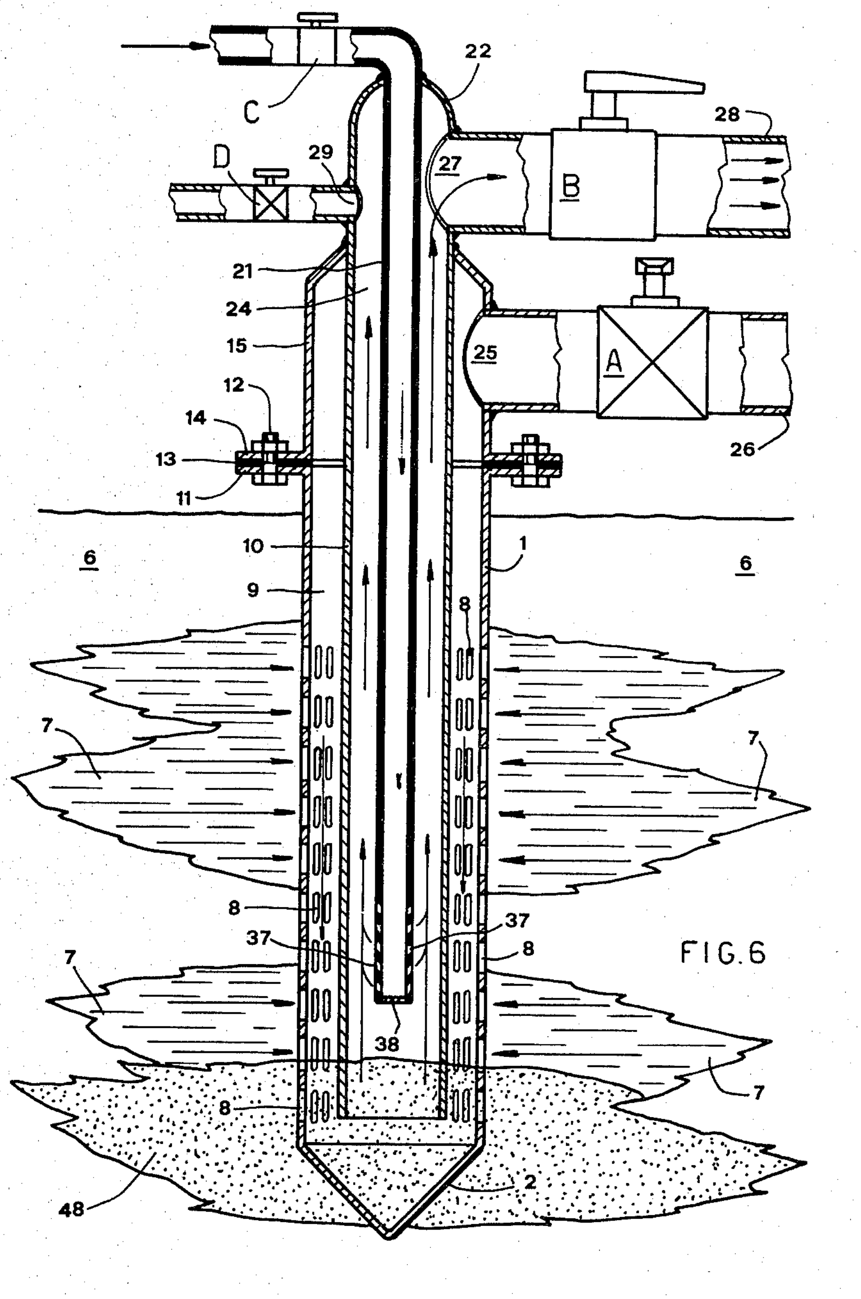
FIG. 6 is a vertical section view of the device applied to a well whose walls are made up of a pipe without surrounding filter, to remove stagnant waters and slime deposited on the well bottom; however, the same device can also be used in wells with filter involving the same problems.

FIGS. 4, 5 and 6 concern the cleaning of very deep wells, valves A, B and D are closed and the valve opened. The compressed air, blown through the valve C into the air supply pipe 21, goes out through slits 23, passes through the open bottom of the widening 16 of the discharge pipe 10, enters the hollow space 9, and goes into the filter 3 through the slits 8 of the well-jacket 1, pushing outwards for many dozens and even hundreds meters the water of water-beds 7 and pushing also upwards some water contained into the well filter 3. In such a way the well remains, for a short time, completely dry. Then, when the well is completely dry, the valve C must be closed and the, valve D opened to discharge the compressed-air. When the compressed-air has been discharged, the valves A and B must be open to let water return into the well from the water-bed, dragging sand, pebble gravel and dirt. Finally (FIG. 6), after the water has returned into the well, the valves A and D must be closed and the valve C opened so that the water with sand, pebble gravel and dirt, can go up along the hollow space 24 by the action of the compressed air and run out through the valve B. The complete drainage of the well and of the surrounding areas will be performed by repeating the operations illustrated in FIGS. 4, 5, 6, many times and at short intervals. The rinse of the filter 3 may be made by injecting clean water coming from pipe 29 from the top into the filter 3.

FIG. 8 shows an example of a device, similar to that of FIG. 2, used to remove a clogging 67 of the well-filter 3, said clogging causing the formation of a cavern 80 in the pebble gravel so that the well-pump may drain away some water mixed with sand because the cavern makes the well-filter useless.

The working of the device of FIG. 8 is as follows. The compressed-air blown into the air supply pipe 21 goes into the well-filter 3 through the slits 65, pushing down the pebble gravel and forcing it to fill the cavern 80. It should be noted that the diaphragms 30 and 31 serve to isolate the zone where the cavern 80 is and that the valves B and D must be closed and the valve C opened to blow compressed-air into the air supply pipe 21, and the valve A must be opened to discharge the compressed-air.

FIG. 9 shows a device useful to remove a block of earth 68 clogging the well-filter. The working of the device is as follows. Some compressed air is injected into the air supply pipe pipe 71 and goes out of the pipe through the slits 77, causing suction which removes the pebble gravel of the filter 3 positioned above earth block 68. After the pebble gravel has been removed, the pipe 71 must be let down until it reaches with its end 76 the earth block 68, breaking it down and eliminating it through the discharge pipe 74. Finally, in order to reconstruct the well-filter and to fill the cavern 69, which has been formed under each earth block, it is necessary to introduce some pebble gravel from the top of the well.

As a practical matter, the execution details, dimensions, materials, and form of the present invention may be changed without going out from its legal domain. In fact, the disclosure thus realized is susceptible to changes and variations, all of them to be included within the scope of the inventive concept. Moreover, all the elements can be replaced with other technically equivalent elements.

We claim:

1. A device for cleaning, widening and repairing of wells having a well-jacket, with holes therein, extending into the earth and being surrounded by a well-filter, the well-jacket ending at the upper portion thereof with a flange, such device comprising:

an air supply pipe for injecting compressed-air into the well, said air supply pipe capable of being extended by means of screwed sections and passing within the well-jacket along the axis of the device;

a first valve connected to the upper end of said air supply pipe;

a water and air discharge pipe, coaxially surrounding said air supply pipe within the well-jacket, for a length greater than that of said air supply pipe, said water and air discharge pipe being terminated at the upper end thereof with a bell which is airtightly connected to the periphery of said air supply pipe;

a second valve, connected to the upper end of said water and air discharge pipe by means of a first port therein;

a water discharge pipe connected to said second valve;

a third valve, connected to the upper end of said water and air discharge pipe by means of a second port therein;

an air discharge pipe connected to said third valve;

a head, airtightly connected at the upper end thereof to the outer periphery of the upper portion of said water and air discharge pipe below the first and second ports thereof, and terminating in a flange detachably secured to the upper flange of the well-jacket, said head having a port therein; and a pipe connected to the port of said head.

2. A device in accordance with claim 1, wherein said air supply pipe is closed at the bottom end thereof and has a plurality of slits, slanted upwardly, provided in the wall thereof at the lower end portion thereof.

3. A device in accordance with claim 1, wherein said water and air discharge pipe is provided with an appropriate number of holes, the diameter thereof decreasing from lower to upper orders, said holes being distributed in several staggered orders within a vertical area which is greater than the area where slits are distributed in the lower part of said air supply pipe; the device further including two annular rubber diaphragms sealing the hollow space between said water and air discharge pipe and the well-jacket in an area where the holes in said water and air discharge pipe are distributed and the holes in the well-jacket are provided.

4. A device according to claim 1, further including gravity operated valve means, connected to the bottom of said water and air discharge pipe, for letting the well bottom sediments pass into the water and air discharge pipe when the valve is open, said valve means comprising:

a ring connected to the bottom of said water and air discharge pipe;

a disk having a peripheral truncated-cone surface which couples with the inner surface of said ring;

a plurality of radially shaped arms inwardly extending at the lower portion of said ring;

a central hub supported by said arms;

a stem, coupled to said central hub with a vertical sliding fit, downwardly extending from said disk; and a counterweight disk connected to the lower portion of said stem and having an appropriate number of holes radially distributed therein that have the function of letting the bottom sediments of the well pass through said counterweight disk and go into the water and air discharge pipe when said counterweight disk is pushed upwardly by contacting the sediments.

5. A device according to claim 1, wherein said air supply pipe, a the lower portion thereof, has a widening which is closed at the bottom end thereof and has a plurality of slits, slanted upwardly, provided in the wall thereof; wherein the water and air discharge pipe has at the lower end thereof a widening coaxially surrounding the widened portion of said air supply pipe; and wherein the device further includes a sheet-steel element, helically shaped, which is secured below the closed bottom wall of said air supply pipe, within the widening of said water and air discharge pipe.

6. A device according to claim 5, wherein said sheet-steel element is fixed at its side edge to the inner wall of said water and air discharge pipe, downwardly extending beyond the bottom of said air supply pipe, and a stem is provided in the sheet-steel element at the upper end thereof.

7. A device for discharge from wells of earth blocks clogging the well-filter and also the pebble gravel well-filter, comprising:

a first pipe section capable of being extended downwardly by means of other sections screwed to it;

a second pipe coaxially surrounded by said first pipe section and terminating at the bottom with a tapered conical end, said second pipe having a plurality of slits slanted upwardly at the lower end thereof;

a pipe fitting connected to the top of said first pipe section and coupled to said second pipe with a vertical sliding fit;

a discharge pipe, connected to extend radially from said pipe fitting; and an air supply pipe coupled to said second pipe to inject compressed-air thereinto.

* * * * *